United States Patent
Doganata et al.

(10) Patent No.: US 8,117,611 B2
(45) Date of Patent: Feb. 14, 2012

(54) METHOD, SYSTEM, AND PROGRAM PRODUCT FOR DEPLOYING A PLATFORM DEPENDENT APPLICATION IN A GRID ENVIRONMENT

(75) Inventors: Yurdaer N. Doganata, Chestnut Ridge, NY (US); Genady Y. Grabarnik, Scarsdale, NY (US); Moon J. Kim, Wappingers Falls, NY (US); Galina Kofman, Katonah, NY (US); Lev Kozakov, Stamford, CT (US); Dikran Meliksetian, Danbury, CT (US); Larisa Shwartz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 924 days.

(21) Appl. No.: 11/365,373

(22) Filed: Mar. 1, 2006

(65) Prior Publication Data

US 2007/0209034 A1    Sep. 6, 2007

(51) Int. Cl.
*G06F 9/445* (2006.01)
(52) U.S. Cl. ........................ 717/174; 718/104
(58) Field of Classification Search .................. 717/106, 717/174, 177; 709/220, 224, 226, 228; 719/328; 718/104
See application file for complete search history.

(56) References Cited

U.S. PATENT DOCUMENTS

| | | | |
|---|---|---|---|
| 5,548,724 A | 8/1996 | Akizawa et al. | |
| 5,659,786 A | 8/1997 | George et al. | |
| 5,784,702 A | 7/1998 | Greenstein et al. | |
| 5,790,886 A | 8/1998 | Allen | |
| 5,812,780 A | 9/1998 | Chen et al. | |
| 6,011,918 A * | 1/2000 | Cohen et al. | 717/106 |
| 6,058,416 A | 5/2000 | Mukherjee et al. | |
| 6,247,109 B1 | 7/2001 | Kleinsorge et al. | |
| 6,275,863 B1 * | 8/2001 | Leff et al. | 709/248 |
| 6,341,314 B1 | 1/2002 | Doganata et al. | |
| 6,487,493 B2 * | 11/2002 | Uekawa et al. | 701/200 |
| 6,532,488 B1 | 3/2003 | Ciarlante et al. | |

(Continued)

FOREIGN PATENT DOCUMENTS

WO    WO95/04968 A1    2/1995

OTHER PUBLICATIONS

Masahiro Ohkawa, IBM Japan, Provide a Façade interface for enterprise Web services, Jan. 6, 2004, (Façade_Interface.pdf).*

(Continued)

*Primary Examiner* — Emerson Puente
*Assistant Examiner* — Hiren Patel
(74) *Attorney, Agent, or Firm* — William E. Schiesser; Hoffman Warnick LLC (57) ABSTRACT

Under the present invention, it is determined whether sufficient resources exist for deploying a platform dependent application on its specific "native" platform in a grid environment. If not, a platform dependent portion of the application is identified, and the application is split into the platform dependent portion and a platform independent portion. Thereafter, the platform dependent portion is deployed on its corresponding native platform, while the platform independent portion is deployed on another platform in the grid environment based on available resources. Interconnections between the two portions can then be automatically generated. This can include, for example, creating remote method invocation facade interfaces, creating remote method invocation-enabled facade classes, and building a remote method invocation server for the first platform.

17 Claims, 5 Drawing Sheets

U.S. PATENT DOCUMENTS

| | | | |
|---|---|---|---|
| 6,587,938 B1 | 7/2003 | Eilert et al. | |
| 6,597,366 B1* | 7/2003 | Bennett et al. | 345/619 |
| 6,597,956 B1 | 7/2003 | Aziz et al. | |
| 6,813,637 B2* | 11/2004 | Cable | 709/226 |
| 6,917,963 B1 | 7/2005 | Hipp et al. | |
| 6,983,463 B1* | 1/2006 | Hunt | 719/316 |
| 7,089,299 B2* | 8/2006 | Chetuparambil et al. | 709/220 |
| 7,143,413 B2* | 11/2006 | McCarthy et al. | 718/104 |
| 7,162,628 B2* | 1/2007 | Gentil et al. | 713/100 |
| 7,171,470 B2 | 1/2007 | Doyle et al. | |
| 7,810,090 B2* | 10/2010 | Gebhart | 717/176 |
| 7,970,902 B2* | 6/2011 | Rolia et al. | 709/226 |
| 2001/0002455 A1* | 5/2001 | Uekawa et al. | 701/200 |
| 2001/0029519 A1 | 10/2001 | Hallinan et al. | |
| 2002/0087621 A1* | 7/2002 | Hendriks | 709/203 |
| 2002/0129085 A1 | 9/2002 | Kubala et al. | |
| 2003/0005109 A1 | 1/2003 | Kambhammettu et al. | |
| 2003/0014604 A1* | 1/2003 | Nishio et al. | 711/159 |
| 2003/0046270 A1 | 3/2003 | Leung et al. | |
| 2003/0046357 A1 | 3/2003 | Doyle et al. | |
| 2003/0061399 A1* | 3/2003 | Wagener et al. | 709/321 |
| 2003/0120701 A1 | 6/2003 | Pulsipher et al. | |
| 2003/0126265 A1 | 7/2003 | Aziz et al. | |
| 2003/0131136 A1* | 7/2003 | Emerson et al. | 709/250 |
| 2003/0154239 A1* | 8/2003 | Davis et al. | 709/201 |
| 2003/0167320 A1 | 9/2003 | Perez | |
| 2003/0187946 A1* | 10/2003 | Cable | 709/215 |
| 2003/0208593 A1 | 11/2003 | Bharati et al. | |
| 2003/0225851 A1 | 12/2003 | Fanshier et al. | |
| 2004/0205206 A1 | 10/2004 | Naik et al. | |
| 2004/0230795 A1 | 11/2004 | Armitano et al. | |
| 2005/0021316 A1 | 1/2005 | Bollobas et al. | |
| 2005/0086640 A1* | 4/2005 | Kolehmainen et al. | 717/120 |
| 2005/0108731 A1* | 5/2005 | Corell et al. | 719/328 |
| 2005/0160104 A1* | 7/2005 | Meera et al. | 707/100 |
| 2005/0198647 A1 | 9/2005 | Hipp et al. | |
| 2006/0015849 A1 | 1/2006 | Polozoff | |
| 2006/0069665 A1* | 3/2006 | Yamakawa et al. | 707/1 |
| 2006/0136908 A1* | 6/2006 | Gebhart et al. | 717/177 |
| 2006/0168567 A1* | 7/2006 | Kressin et al. | 717/124 |
| 2007/0058631 A1 | 3/2007 | Mortier et al. | |

OTHER PUBLICATIONS

Sheresh et al., "Microsoft Windows NT Server Administrator's Bible: Option Pack Edition", Chapter 1, p. 2, Apr. 1999.

Tatsubori, M., et al, "A Bytecode Translator for Distributed Execution of Legacy Java Software", Lecture Notes in Computer Science, Springer Verlag, Berlin, DE, vol. 2072, 2001, pp. 236-255.

Marlon Machado: "Enable Existing Applications for Grid", IBM On-line DeveloperWorks, Jun. 22, 2004, URL: http://www.ibm.com/developerworks/grid/library/gr-exist/.

Durham, U.S. Appl. No. 10/718,419, filed Nov. 20, 2003, Office Action Summary, Nov. 14, 2005, 27 pages.

Durham, U.S. Appl. No. 10/718,419, filed Nov. 20, 2003, Office Action Summary, Apr. 6, 2006, 33 pages.

Durham, U.S. Appl. No. 10/718,419, filed Nov. 20, 2003, Office Action Summary, Aug. 9, 2006, 29 pages.

Durham, U.S. Appl. No. 10/718,419, filed Nov. 20, 2003, Notice of Allowance and Fee(s) Due, Feb. 21, 2007, 7 pages.

Drissi, U.S. Appl. No. 11/068,368, filed Feb. 28, 2005, Office Action Summary, Mar. 10, 2008, 16 pages.

Drissi, U.S. Appl. No. 11/068,368, filed Feb. 28, 2005, Office Action Summary, Aug. 11, 2008, 16 pages.

Drissi, U.S. Appl. No. 11/068,368, filed Feb. 28, 2005, Office Action Summary, Dec. 29, 2008, 16 pages.

Drissi, U.S. Appl. No. 11/068,368, filed Feb. 28, 2005, Office Action Summary, Jun. 18, 2009, 20 pages.

Bela Bollabas et al., "Coupling Scale-Free and Classical Random Graphs", Internet Mathematics vol. 1, No. 2, dated 2003, pp. 215-225.

Bela Bollobas et al., "Robustness and Vulnerability of Scale-Free Random Graphs", Internet Mathematics vol. 1, No. 1, dated 2002, pp. 1-35.

Alina Beygelzimer et al, "Improving Network Robustness by Edge Modification", IBM TJ Watson Research Center, dated Mar. 30, 2005.

Sheresh et al, "Distributed File System", Found at:Server Administrators Bible:Option Pack Edition, pulled from www.windowsitlibrary.com/content/405/25/1.html, dated 1999.

Grabarnik, U.S. Appl. No. 11/358,304, Office Action Communication, Apr. 3, 2009, 11 pages.

Grabarnik, U.S. Appl. No. 11/358,304, Office Action Communication, Nov. 12, 2009, 11 pages.

Drissi et al., U.S. Appl. No. 11/068,368, filed Feb. 28, 2005, Office Action dated Dec. 7, 2009, 21 pages.

Drissi et al., U.S. Appl. No. 11/068,368, filed Feb. 28, 2005, Office Action Communication dated Jun. 10, 2010, 26 pages.

Grabarnik et al., U.S. Appl. No. 11/358,304, filed Feb. 21, 2006, Notice of Allowance and Fee(s) Due dated Jun. 28, 2010, 38 pages.

Sheresh et al., "Microsoft Windows NT Server Administrator's Bible: Option Pack Edition", Retrieved from http://www.windowsitlibrary.com/Documents/Book.cfm?DocumentID=405, Nov. 2005, 7 pages.

Nguyen, Notice of Allowance and Fee(s) Due dated Sep. 24, 2010 for U.S. Appl. No. 11/358,304, 8 pages.

Wright, Examiner's Answer for U.S. Appl. No. 11/068,368 dated Apr. 6, 2011, 24 pages.

* cited by examiner

FIG. 5 though, but also takes performance-based parameters such as storage capacity, user requirements, etc., into consideration when selecting a file sharing location.

METHOD, SYSTEM, AND PROGRAM PRODUCT FOR DEPLOYING A PLATFORM DEPENDENT APPLICATION IN A GRID ENVIRONMENT

CROSS-REFERENCE TO RELATED APPLICATIONS

This Application is related in some aspects to commonly assigned U.S. application Ser. No. 10/718,419, entitled "COMPUTERIZED SYSTEM, METHOD AND PROGRAM PRODUCT FOR MANAGING AN ENTERPRISE STORAGE SYSTEM" filed Nov. 20, 2003 and herein incorporated by reference. The application is also related in some aspects to commonly assigned U.S. application Ser. No. 11/068,368 entitled "COMPUTERIZED SYSTEM, METHOD, AND PROGRAM PRODUCT FOR MANAGING APPLICATIONS IN A SHARED COMPUTER INFRASTRUCTURE" filed Feb. 28, 2005 and herein incorporated by reference.

FIELD OF THE INVENTION

In general, the present invention relates to application deployment. Specifically, the present invention relates to a method, system, and program product for deploying a platform dependent application in a grid environment

BACKGROUND OF THE INVENTION

Today's common web service architecture provides multiple services within a single infrastructure. Enterprises with common needs are also coming together to share infrastructure and business processes. An advantage of this approach is that each involved party pays only a fraction of the entire cost involved. The above-incorporated patent applications disclose a storage grid architecture that optimizes storage utilization by "gridifying" storage cells within a common infrastructure. This type of structure not only provides redundancy, but also takes performance-based parameters such as storage capacity, user requirements, etc., into consideration when selecting a file sharing location.

One issue that arises with shared infrastructures involves the deployment of platform dependent applications. A grid environment generally requires applications to be able to run under any platform to provide the best load balancing for the grid components. As such, pure Java (Java and all Java-based trademarks are trademarks of Sun Microsystems, Inc. in the United States, other countries, or both) applications are good candidates for running in a grid environment due to their proclaimed platform independence. However, some important Java applications have to mix platform independent code with platform dependent/specific native calls. Such an application is therefore considered to be platform dependent and may only run on a platform compatible with its native code. Running a platform dependent Java application in a grid environment represents additional challenges, because of the limitation it imposes on the choice of a target platform.

In view of the foregoing, there exists a need to overcome the above-cited deficiencies.

SUMMARY OF THE INVENTION

In general, the present invention provides a method, system, and program product for deploying a platform dependent application in a grid environment. Specifically, under the present invention, it is first determined whether sufficient resources exist for deploying the platform dependent application on its specific "native" platform in the grid environment. If not, a platform dependent portion of the application is identified, and the application is split into the platform dependent portion and a platform independent portion. Thereafter, the platform dependent portion is deployed on its corresponding native platform, while the platform independent portion is deployed on another platform in the grid environment based on available resources. Interconnections between the two portions can then be automatically generated. This can include, for example, creating remote method invocation facade interfaces, creating remote method invocation-enabled facade classes, and building a remote method invocation server for the first platform.

A first aspect of the present invention provides a method for deploying a platform dependent application in a grid environment, comprising: identifying a platform dependent portion of the platform dependent application; splitting the platform dependent application into the platform dependent portion and a platform independent portion; deploying the platform dependent portion on a first platform and the platform independent portion on a second platform in the grid environment; and generating interconnections between the platform dependent portion and the platform independent portion.

A second aspect of the present invention provides a system for deploying a platform dependent application in a grid environment, comprising: a system for determining available resources for running the platform dependent application on a first platform of the grid environment; a system for identifying a platform dependent portion of the platform dependent application; a system for splitting the platform dependent application into the platform dependent portion and a platform independent portion; a system for deploying the platform dependent portion on a first platform and the platform independent portion on a second platform in the grid environment; and a system for generating interconnections between the platform dependent portion and the platform independent portion.

A third aspect of the present invention provides a program product stored on a computer useable medium for deploying a platform dependent application in a grid environment, the computer useable medium comprising program code for causing a computer system to perform the following steps: determining available resources for running the platform dependent application on a first platform of the grid environment; identifying a platform dependent portion of the platform dependent application; splitting the platform dependent application into the platform dependent portion and a platform independent portion; deploying the platform dependent portion on a first platform and the platform independent portion on a second platform in the grid environment; and generating interconnections between the platform dependent portion and the platform independent portion.

A fourth aspect of the present invention provides a method for deploying a platform dependent application in a grid environment, comprising: providing a computer infrastructure being operable to: identify a platform dependent portion of the platform dependent application; split the platform dependent application into the platform dependent portion and a platform independent portion; deploy the platform dependent portion on a first platform and the platform independent portion on a second platform in the grid environment; and generate interconnections between the platform dependent portion and the platform independent portion.

A fifth aspect of the present invention provides computer software embodied in a propagated signal for deploying a platform dependent application in a grid environment, the computer software comprising instructions for causing a computer system to perform the following steps: providing a computer infrastructure being operable to: identify a platform dependent portion of the platform dependent application; split the platform dependent application into the platform dependent portion and a platform independent portion; deploy the platform dependent portion on a first platform and the platform independent portion on a second platform in the grid environment; and generate interconnections between the platform dependent portion and the platform independent portion.

A sixth aspect of the present invention provides a business method for deploying a platform dependent application in a grid environment.

Therefore, the present invention provides a method, system and program product for deploying a platform dependent application in a grid environment.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

As indicated above, the present invention provides a method, system, and program product for deploying a platform dependent application in a grid environment. Specifically, under the present invention, it is first determined whether sufficient resources exist for deploying the platform dependent application on its specific "native" platform in the grid environment. If not, a platform dependent portion of the application is identified, and the application is split into the platform dependent portion and a platform independent portion. Thereafter, the platform dependent portion is deployed on its corresponding native platform, while the platform independent portion is deployed on another platform in the grid environment based on available resources. Interconnections between the two portions can then be automatically generated. This can include, for example, creating remote method invocation facade interfaces, creating remote method invocation-enabled facade classes, and building a remote method invocation server for the first platform.

Figure 1:
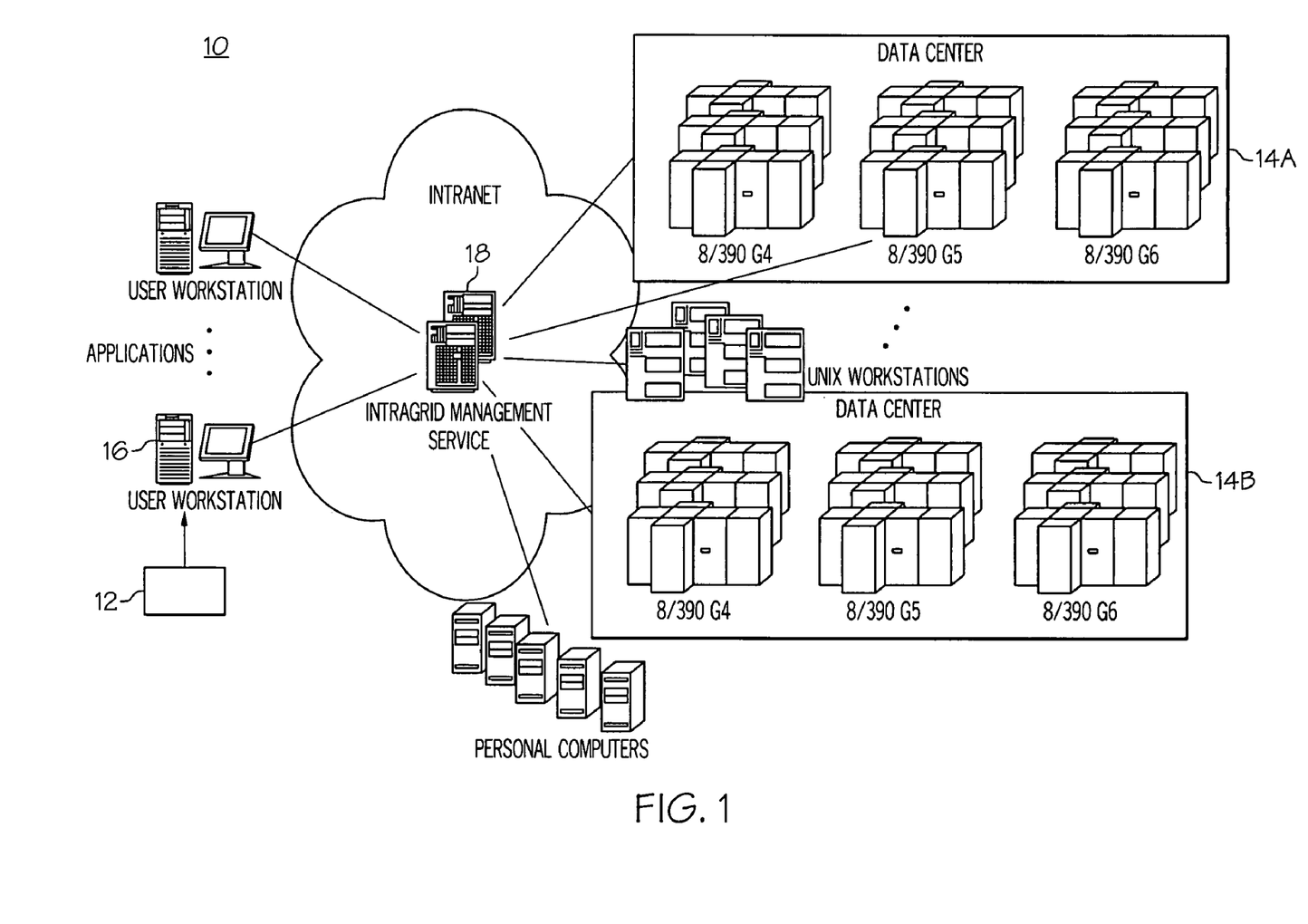
FIG. 1 depicts a grid environment in accordance with the related art.

Referring now to FIG. 1, a grid environment 10 is shown. In general, grid environment 10 allows users such as user 12 to store files and the like in one or more data centers or "storage cells" 14A-B that are managed by management service 18. To this extent, grid environment 10 is typically implemented over a network such as the Internet, a local area network (LAN), a wide area network (WAN), a virtual private network (VPN), etc. As such, communication between the various components shown in FIG. 1 could occur in a client-server or server-server environment via a direct hardwired connection (e.g., serial port), or via an addressable connection that may utilize any combination of wireline and/or wireless transmission methods. The components may utilize conventional network connectivity, such as Token Ring, Ethernet, WiFi or other conventional communications standards. Moreover, connectivity could be provided by conventional TCP/IP sockets-based protocol. In this instance, the components could utilize an Internet service provider to establish connectivity. It should be appreciated that the architecture shown in FIG. 1 is intended to be illustrative only and that other variations could be implemented within the scope of the present invention. For example, any quantity of data centers 14A-B could be provided.

Regardless, in a typical embodiment, user 12 will store a file by generating a request via an application on his/her computer system 16 (e.g., a personal computer, a workstation, a laptop, a hand-held device, etc.). Once the request is made, management service 18 will determine the most optimal or appropriate data center 14A-B for storing the file. In general, this determination is made under the present invention based on certain predetermined performance parameters. For example, the determination can be made based upon a user identity, a storage cost, a specific user requirement, a desired cell usage pattern/balance, a security requirement, a storage cell availability, a redundancy requirement and a network optimization requirement. Thus, if a file required access by a group of users, it could be stored in a data center 14A-B that is most central to all such users, not just the user requesting the storage. Moreover, if a certain data center 14A-B was nearing capacity, the file might be stored in another (albeit more distant) data center 14A-B so that the load of data centers 14A-B could be kept balanced.

Figure 2:
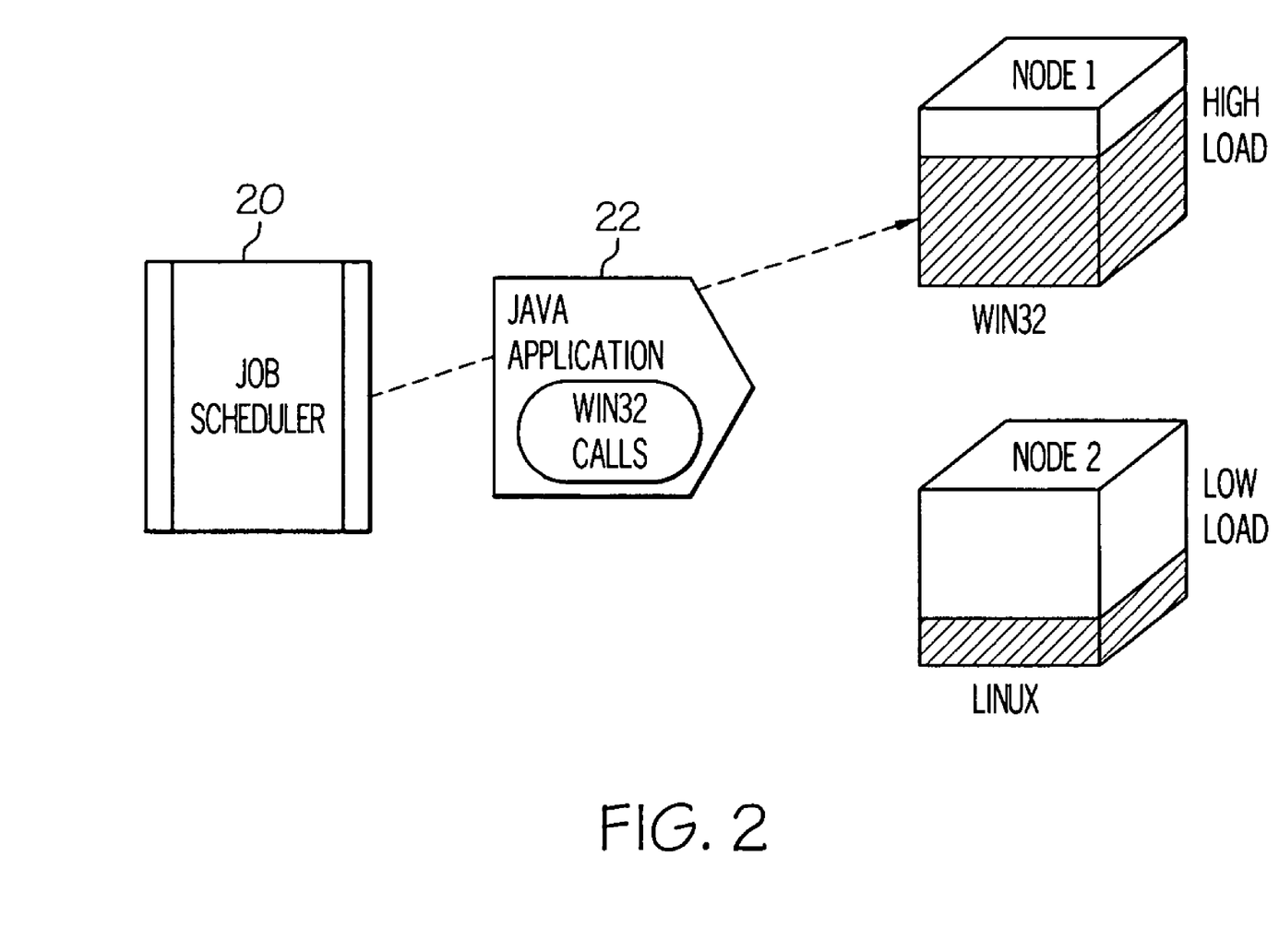
FIG. 2 depicts a job scheduler determining available resources for an application according to the present invention.

As shown in FIG. 2, in existing grid systems, a job scheduler 20 operates on the application level (i.e., to schedule an application 22 to run on a specific node it needs to obtain all required resources on this node). Job scheduler 20 will typically delay the application execution until required resources are available such as on a target "native" platform (e.g., node 1 running WIN32, node 2 running LINUX, etc.).

As indicated above, however, many applications such as application 22 are platform dependent on some level. This could become an issue in a grid environment when resources are limited. In such a case, the present invention will automatically adapt application 22 to enable running the platform independent portion of it on any available platform while the platform dependent portion (native portion) is running on the required platform, consuming minimum resources on that platform.

Figure 3:
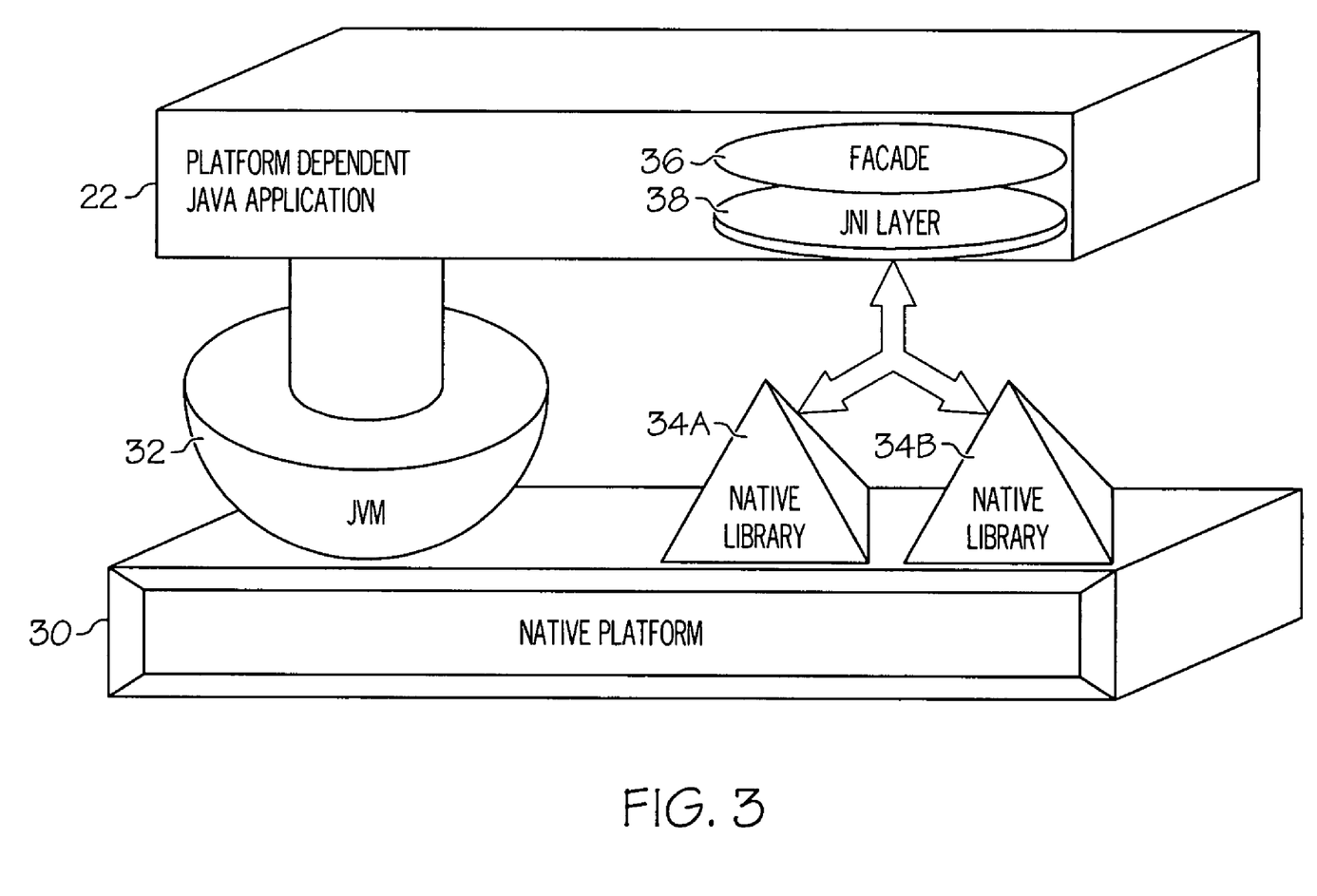
FIG. 3 depicts a general view of a platform dependent application in accordance with the present invention.

Referring to FIG. 3, the deployment of a platform dependent application 22 on its native platform 30 is depicted. Specifically, FIG. 3 depicts the deployment of entire Java application 22 on platform 30. Also shown in FIG. 3 are Java virtual machine (JVM) 32, native libraries 34A-B, facade 36, JNI layer 38. As mentioned above, there are occasionally insufficient resources for deploying application 22 entirely on its native platform 30.

Figure 4:
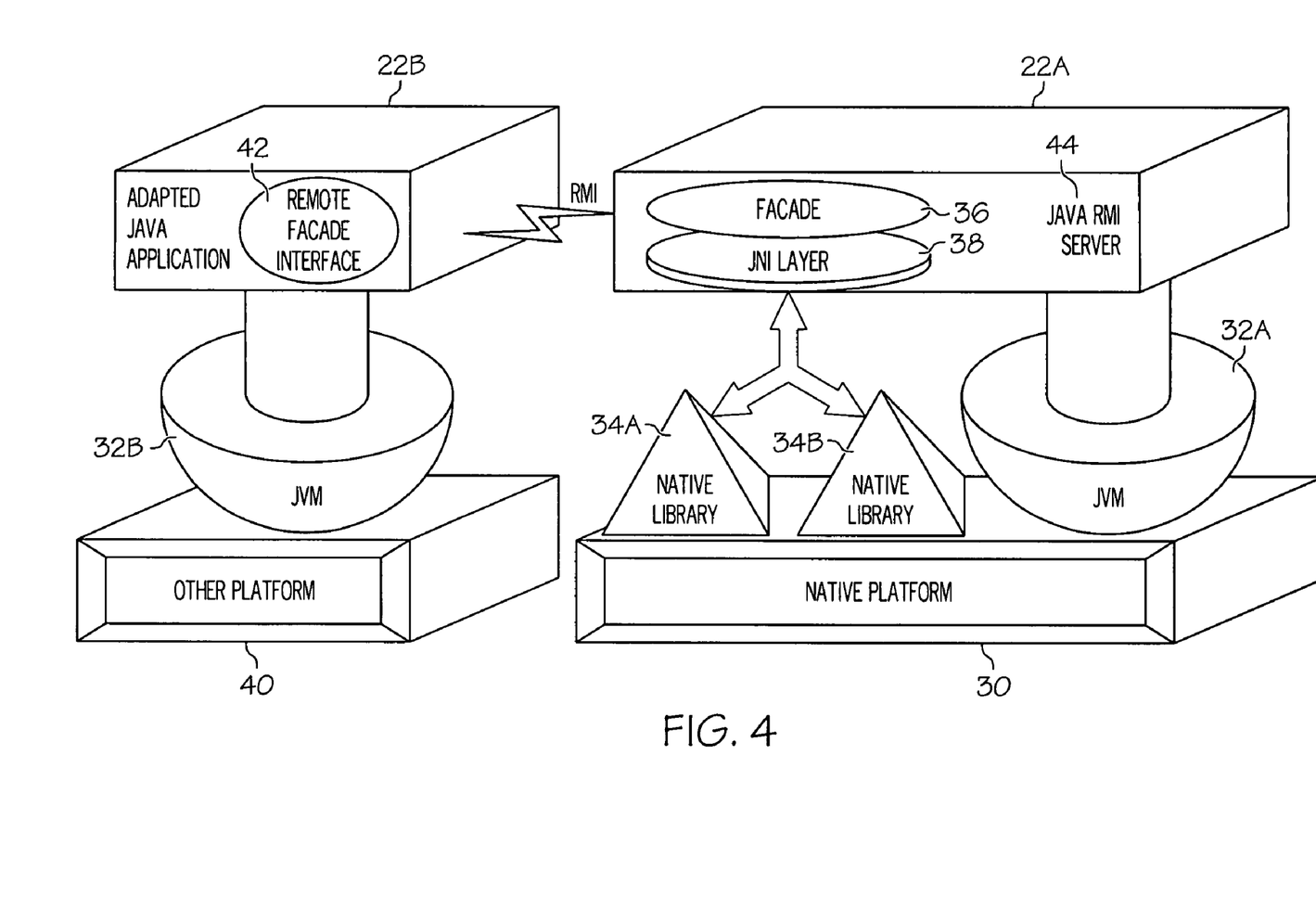
FIG. 4 depicts a general view of the platform dependent application of FIG. 3 after being adapted according to the present invention.

To address this issue, the present invention implements a technique as shown in FIG. 4. Specifically, under the present invention, job scheduler 20 (FIG. 2) will first determine whether sufficient resources exist for deploying application 22 on its native platform 30. Assuming in this illustrative example that sufficient resources do not exist, a platform dependent portion 22A of application 22 will be identified. Such identification can be made by consulting metadata for application 22. Regardless, application 22 will be split into a platform dependent portion 22A and the platform independent portion 22B. This can be done based upon analysis of the underlying code to determine which portions depend (or do not depend) upon a particular platform. Once the split has occurred, grid job scheduler 20 will deploy platform dependent portion 22A on native platform 30 and platform independent portion 22B on any other platform 40 in the grid environment based on available resources. Specifically, grid job scheduler 20 will analyze the resource availability for other platforms, and deploy platform independent portion 22B based thereon.

In addition, the present invention will automatically generate interconnections between platform dependent portion 22A and platform independent portion 22B. This can include the following steps: (1) Creating remote facade interfaces 42. Every facade method, which originally was used to access native methods, needs to be a method of a remote Java interface. This requirement comes from the need to access the methods remotely. Remote Java interfaces need to extend the standard java.rmi.Remote interface. The application will use these remote Java interfaces to access corresponding native methods. (2) Creating RMI-enabled facade classes. All existing dedicated facade classes need to be made RMI-enabled and implement the corresponding remote Java interfaces. If not all facade methods are included in dedicated classes, a new RMI-enabled class needs to be created to implement the corresponding remote facade Java interfaces. (3) Building Java RMI server 44. To provide remote access to instances of facade classes, the Java RMI server 44 needs to be built and deployed on the native platform. The Java RMI server 44 will create instances of remote facade classes upon request, register them in the local RMI registry and return remote Java interfaces to the caller.

As can be seen Java application code becomes platform independent by separating platform dependent code from the rest of the application and make it remotely accessible. The native object libraries run in their native platform and they are accessed via remote accessing API. As further shown, the typical embodiment of the present invention utilizes Remote Method Invocation (RMI), although it should be understood that other equivalents could be utilized.

Figure 5:
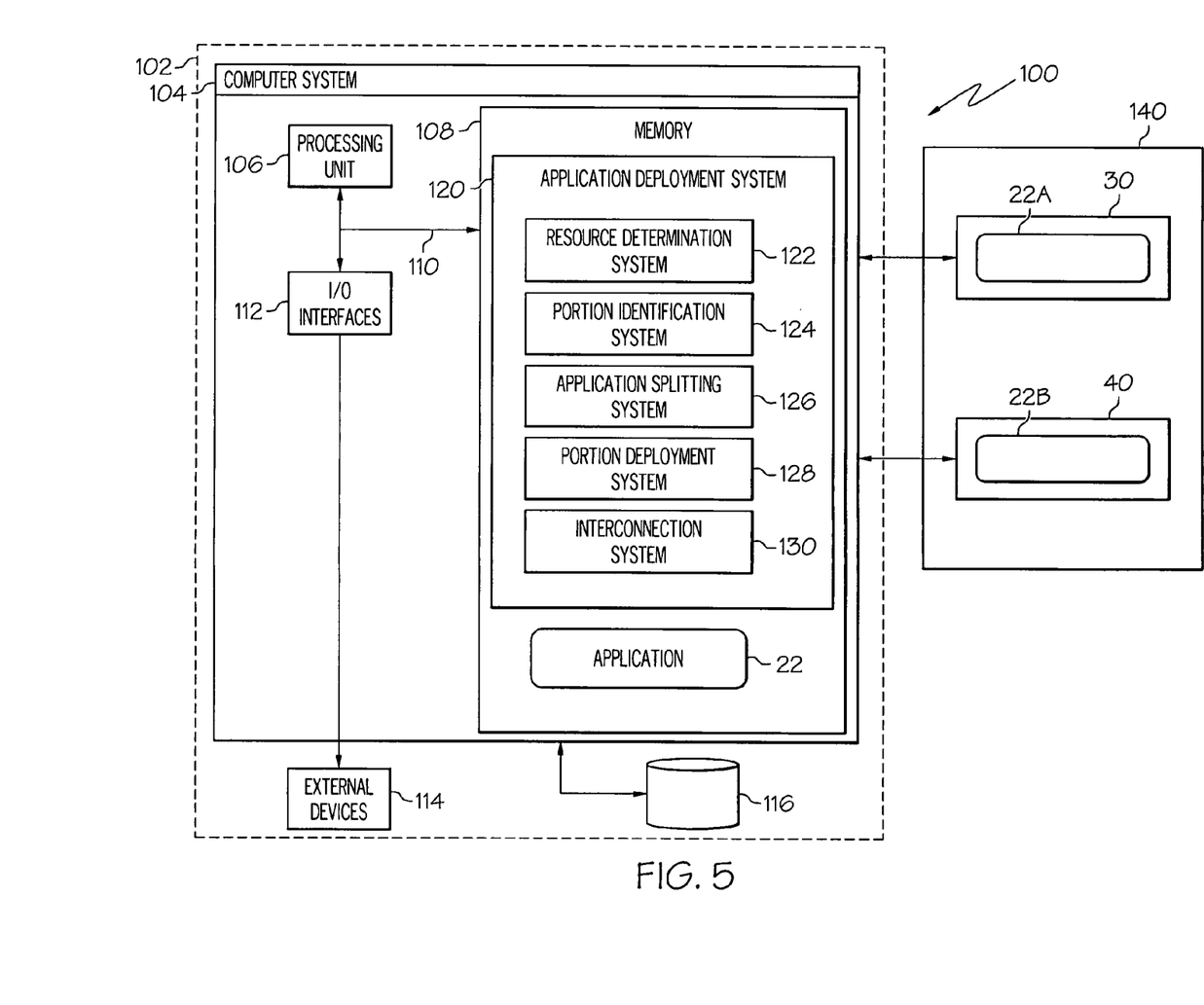
FIG. 5 depicts a more specific computerized implementation of the present invention.

Referring now to FIG. 5, a more detailed diagram of a computerized implementation 100 of the present invention is shown. As depicted, implementation 100 includes a computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to deploy an application in a grid environment.

As shown, computer system 104 includes a processing unit 106, a memory 108, a bus 110, and input/output (I/O) interfaces 112. Further, computer system 104 is shown in communication with external I/O devices/resources 114 and storage system 116. In general, processing unit 106 executes computer program code, such as application deployment system 120, which is stored in memory 108 and/or storage system 116. While executing computer program code, processing unit 106 can read and/or write data to/from memory 108, storage system 116, and/or I/O interfaces 112. Bus 110 provides a communication link between each of the components in computer system 104. External devices 114 can comprise any devices (e.g., keyboard, pointing device, display, etc.) that enable a user to interact with computer system 104 and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process steps of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, I/O interfaces 112 can comprise any system for exchanging information with one or more external devices 114. Still further, it is understood that one or more additional components (e.g., system software, math co-processing unit, etc.) not shown in FIG. 5 can be included in computer system 104. However, if computer system 104 comprises a handheld device or the like, it is understood that one or more external devices 114 (e.g., a display) and/or storage system(s) 116 could be contained within computer system 104, not externally as shown.

Storage system 116 can be any type of system (e.g., a database) capable of providing storage for information under the present invention, applications, metadata, etc. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). Although not shown, additional components, such as cache memory, communication systems, system software, etc., may be incorporated into computer system 104.

Shown in memory 108 of computer system 104 is application deployment system 120, which is a software program that will provide the functions of the present invention, and which includes resource determination system 122, portion identification system 124, application splitting system 126, portion deployment system 128, and interconnection system 130. These systems perform the functions outlined above. Specifically, resource determination system 122 will determine whether sufficient resources exist to deploy application 22 on its native platform. If not, portion identification system 124 will identify the platform dependent portion 22A of application 20. Thereafter, application splitting system 126 will split application 22 into a platform dependent portion 22A and a platform independent portion 22B. Once split in this manner, portion deployment system 128 will deploy platform dependent portion 22A to its corresponding native platform 30, and platform independent portion on another platform 40 within grid environment 140 based on resource availability. Once the portions 22A-B are deployed, interconnection system 130 will automatically generate interconnects there between. As indicated above, this can include the following: (1) creating remote facade interfaces; (2) creating RMI-enabled facade classes; and (3) building Java RMI server. It should be understood that some or all of the systems of application deployment system 120 could be implemented as job scheduler 20 (FIG. 2).

While shown and described herein as a method and system deploying an application in a grid environment, it is understood that the invention further provides various alternative embodiments. For example, in one embodiment, the invention provides a computer-readable/useable medium that includes computer program code to enable a computer infrastructure to deploy an application in a grid environment. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 5) and/or storage system 116 (FIG. 5) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to deploy an application in a grid environment. In this case, the service provider can create, maintain, support, etc., a computer infrastructure, such as computer infrastructure 102 (FIG. 5) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for deploying an application in a grid environment. In this case, a computer infrastructure, such as computer infrastructure 102 (FIG. 5), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 104 (FIG. 5), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for deploying a platform dependent application in a grid environment, comprising:

determining whether sufficient resources exist for deploying an entirety of the platform dependent application on a native platform that has a native architecture for which the platform dependent application was developed;

deploying, based on a determination that the sufficient resources exist, the entirety of the platform dependent application on the native platform; and deploying, based on a determination that the sufficient resources do not exist, the platform dependent application as follows:

identifying a platform dependent portion of the platform dependent application, the platform dependent portion being a portion of the platform dependent application that is designed for the native platform and will not run on another platform;

splitting, via a computer device, the platform dependent application into the platform dependent portion and a platform independent portion;

deploying the platform dependent portion on a first platform and the platform independent portion on a second platform, both of the first platform and the second platform being servers that are corresponding storage cell nodes, upon which an entirety of the application is stored upon, managed by a management service in the grid environment, the grid environment having a plurality of geographically distributed storage cell nodes for storing managed data for users that are remote from the storage cell nodes; and generating interconnections between the platform dependent portion and the platform independent portion, wherein the generating comprises:

creating remote method invocation facade interfaces;

creating remote method invocation-enabled facade classes; and building a remote method invocation server for the first platform.

2. The method of claim 1, wherein the generating comprises automatically generating the interconnections.

3. The method of claim 1, wherein the deploying is performed by a grid job scheduler.

4. The method of claim 1, further comprising determining available resources for the platform dependent application.

5. The method of claim 1, wherein the first platform is specific to the platform dependent portion and wherein the second platform is selected based on available resources in the grid environment.

6. A system for deploying a platform dependent application in a grid environment, comprising:
   a computer device that performs a method, comprising:
   determining available resources for running the platform dependent application on a first platform of the grid environment, the grid environment being a geographically distributed storage grid;
   determining whether the available resources are sufficient for running an entirety of the platform dependent application on the first platform, the first platform being a native platform that has a native architecture for which the platform dependent application was developed;
   deploying, based on a determination that the available resources are sufficient, the entirety of the platform dependent application on the native platform; and
   deploying, based on a determination that the available resources are not sufficient, the platform dependent application as follows:
      identifying, in case that available resources are not available on the first platform, a platform dependent portion of the platform dependent application, the platform dependent portion being a portion of the platform dependent application that is designed for the native platform and will not run on another platform;
      splitting, in case that available resources are not available on the first platform, the platform dependent application into the platform dependent portion and a platform independent portion;
      deploying, in case that available resources are not available on the first platform, the platform dependent portion on the first platform and the platform independent portion on a second platform in the grid environment, both of the first platform and the second platform being servers that are corresponding storage cell nodes, upon which an entirety of the application is stored upon and run on, managed by a management service in the grid environment, the grid environment having a plurality of geographically distributed storage cell nodes for storing managed data for users that are remote from the storage cell nodes; and
      generating, in case that available resources are not available on the first platform, interconnections between the platform dependent portion and the platform independent portion, wherein the generating creates remote method invocation facade interfaces, creates remote method invocation-enabled facade classes, and builds a remote method invocation server for the first platform.

7. The system of claim 6, wherein the generating automatically generates the interconnections.

8. The system of claim 6, wherein the deploying is performed by a grid job scheduler.

9. The system of claim 6, wherein the first platform is specific to the platform dependent portion, and wherein the second platform is selected based on available resources in the grid environment.

10. A program product stored on a computer readable storage medium for deploying a platform dependent application in a grid environment, the computer useable medium comprising program code for causing a computer system to perform the following steps:
    determining available resources for running the platform dependent application on a first platform of the grid environment, the grid environment being a geographically distributed storage grid;
    determining whether the available resources are sufficient for running an entirety of the platform dependent application on the first platform, the first platform being a native platform that has a native architecture for which the platform dependent application was developed;
    deploying, based on a determination that the available resources are sufficient, the entirety of the platform dependent application on the native platform; and
    deploying, based on a determination that the available resources are not sufficient, the platform dependent application as follows:
       identifying a platform dependent portion of the platform dependent application, the platform dependent portion being a portion of the platform dependent application that is designed for the native platform and will not run on another platform;
       splitting the platform dependent application into the platform dependent portion and a platform independent portion;
       deploying the platform dependent portion on the first platform and the platform independent portion on a second platform in the grid environment, both of the first platform and the second platform being servers that are corresponding storage cell nodes, upon which an entirety of the application is stored upon and run on, managed by a management service in the grid environment, the grid environment having a plurality of geographically distributed storage cell nodes for storing managed data for users that are remote from the storage cell nodes; and
       generating interconnections between the platform dependent portion and the platform independent portion, wherein the generating comprises:
          creating remote method invocation facade interfaces;
          creating remote method invocation-enabled facade classes; and
          building a remote method invocation server for the first platform.

11. The program product of claim 10, wherein the generating step comprises automatically generating the interconnections.

12. The program product of claim 10, wherein the first platform is specific to the platform dependent portion, and wherein the second platform is selected based on available resources in the grid environment.

13. A method for deploying a platform dependent application in a grid environment, comprising:
    providing a computer infrastructure that includes at least one computer device being operable to:
    determine whether sufficient resources exist for deploying an entirety of the platform dependent application on a native platform that has a native architecture for which the platform dependent application was developed;
    deploy, based on a determination that the sufficient resources exist, the entirety of the platform dependent application on the native platform; and
    deploy, based on a determination that the sufficient resources do not exist, the platform dependent application as follows:

identify a platform dependent portion of the platform dependent application, the platform dependent portion being a portion of the platform dependent application that is designed for the native platform and will not run on another platform;

split the platform dependent application into the platform dependent portion and a platform independent portion;

deploy the platform dependent portion on a first platform and the platform independent portion on a second platform, both of the first platform and the second platform being servers that are corresponding storage cell nodes, upon which an entirety of the application is stored upon, managed by a management service in the grid environment, the grid environment having a plurality of geographically distributed storage cell nodes for storing managed data for users that are remote from the storage cell nodes; and generate interconnections between the platform dependent portion and the platform independent portion, wherein the generating comprises:

create remote method invocation facade interfaces;

create remote method invocation-enabled facade classes; and build a remote method invocation server for the first platform.

14. The method of claim 13, wherein the computer infrastructure is further operable to automatically generate the interconnections.

15. The method of claim 13, wherein the computer infrastructure comprises a grid job scheduler to deploy the platform dependent portion and the platform independent portion.

16. The method of claim 13, wherein the computer infrastructure is further operable to determine available resources for the platform dependent application.

17. The method of claim 13, wherein the first platform is specific to the platform dependent portion, and wherein the second platform is selected based on available resources in the grid environment.

* * * * *